(12) United States Patent
Jawurek et al.

(10) Patent No.: US 8,731,199 B2
(45) Date of Patent: May 20, 2014

(54) ZERO KNOWLEDGE PROOFS FOR ARBITRARY PREDICATES OVER DATA

(71) Applicant: SAP AG, Walldorf (DE)

(72) Inventors: Marek Jawurek, Mannheim (DE); Florian Kerschbaum, Karlsruhe (DE)

(73) Assignee: SAP AG, Walldorf (DE)

( * ) Notice: Subject to any disclaimer, the term of this patent is extended or adjusted under 35 U.S.C. 154(b) by 123 days.

(21) Appl. No.: 13/631,038

(22) Filed: Sep. 28, 2012

(65) Prior Publication Data

US 2014/0093077 A1 Apr. 3, 2014

(51) Int. Cl.
*H04L 9/00* (2006.01)

(52) U.S. Cl.
USPC .......................................... 380/268; 713/193

(58) Field of Classification Search
USPC ........................................................ 380/268
See application file for complete search history.

(56) References Cited

U.S. PATENT DOCUMENTS

| | | | | |
|---|---|---|---|---|
| 7,680,273 | B2 * | 3/2010 | Whitehead et al. | 380/46 |
| 7,856,100 | B2 * | 12/2010 | Wang et al. | 380/30 |
| 7,945,050 | B2 * | 5/2011 | Mozak | 380/268 |
| 8,074,076 | B2 * | 12/2011 | Courtois | 713/189 |
| 2013/0124850 | A1 * | 5/2013 | Gomez Marmol et al. | 713/150 |
| 2014/0023193 | A1 * | 1/2014 | Landheer | 380/268 |

OTHER PUBLICATIONS

J. B. Almeida, E. Bangerter, M. Barbosa, S. Krenn, A.-R. Sadeghi, and T. Schneider. A certifying compiler for zero-knowledge proofs of knowledge based on Σ-protocols. In Proceedings of the 15th European conference on Research in computer security, ESORICS'10, pp. 151-167, Berlin, Heidelberg, 2010 Springer-Verlag.

E. Bangerter, T. Briner, W. Henecka, S. Krenn, A.-R. Sadeghi, and T. Schneider. Automatic generation of sigma-protocols. In Public Key Infrastructures, Services and Applications—6th European Workshop, EuroPKI 2009, Pisa, Italy, Sep. 10-11, 2009, Revised Selected Papers, vol. 6391 of Lecture Notes in Computer Science, pp. 67-82. Springer, 2009.

M. Blum, P. Feldman, and S. Micali. Non-interactive zero-knowledge and its applications. In Proceedings of the twentieth annual ACM symposium on Theory of Computing, STOC '88, pp. 103-112, New York, NY, USA, 1988. ACM.

J.-M. Bohli, O. Ugus, and C. Sorge. A privacy model for smart metering. In Proceedings of the First IEEE International Workshop on Smart Grid Communications (in conjunction with IEEE ICC 2010), 2010.

(Continued)

*Primary Examiner* — Mohammad W Reza
*Assistant Examiner* — Monjour Rahim
(74) *Attorney, Agent, or Firm* — Fountainhead Law Group PC

(57) ABSTRACT

A first computing device transfers first and second commitments to a second computing device. The first commitment is for private data and a first random number and the second commitment is for second and third random numbers. The method includes producing a result by evaluating a predicate and a first support function of a garbled circuit. The result includes a first part and a second part, referred to as the predicate result. The method includes transferring the result to the second computing device; receiving a second challenge from the second computing device; and producing a second response from a second support function using the second challenge. The method includes transferring the second response to the second computing device. The predicate result over the private data is true if a result of a check function is equal to a third commitment of the first part and the second response.

20 Claims, 5 Drawing Sheets

(56) References Cited

OTHER PUBLICATIONS

F. Boudot. Efficient proofs that a committed number lies in an interval. In Proceedings of the 19th International Conference on the Theory and Application of Cryptographic Techniques, EUROCRYPT'00, pp. 431-444, Berlin, Heidelberg, 2000. Springer-Verlag.
E. F. Brickell, D. Chaum, I. Damgard, and J. v. d. Graff. Gradual and variable release of a secret. In a Conference on the Theory and Applications of Cryptographic Techniques on Advances in Cryptology, CRYPTO '87, pp. 156-166, London, UK, 1988. Springer-Verlag.
J. Camenisch, R. Chaabouni, and A. Shelat. Efficient protocols for set membership and range proofs. In Proceedings of the 14th International Conference on the Theory and Application of Cryptology and Information Security: Advances in Cryptology, ASIACRYPT '08, pp. 234{252, Berlin, Heidelberg, 2008. Springer-Verlag.
A. H. Chan, Y. Frankel, and Y. Tsiounis. Easy come—easy go divisible cash. In Advances in Cryptology—Eurocrypt '98, International Conference on the Theory and Application of Cryptographic Techniques, Espoo, Finland, May 31-Jun. 4, 1998, Proceeding, vol. 1403 of EUROCRYPT'98, pp. 561-575. Springer-Verlag, 1998.
I. Damgard. On $\Sigma$-protocols, 2011 (accessed Mar. 28, 2012). https://services. Retrieved from: brics.dk/java/courseadmin/CPT/documents/getDocument/Sigma.pdf?d=53899.
J. K. David Evans, William Melicher. Fast Secure Computation Using Garbled Circuits, 2011 (accessed Mar. 28, 2012). http://mightbeevil.org/framework/.
S. Z. David Evans, William Melicher. Interpreter for Garbled Circuits Intermediate Language, 2012 (accessed Mar. 28, 2012). http://mightbeevil.org/gcparser/.
N. P. (ed.) et al., 2009 (accessed Mar. 28, 2012). Retrieved from: http://www.cace-project.eu/downloads/deliverables-y2/CACE_D3.5_M18.pdf.
S. Even, O. Goldreich, and A. Lempel. A randomized protocol for signing contracts. Communications of the ACM, 28(6):637-647, Jun. 1985.
U. Feige, and A. Shamir. Zero knowledge proofs of knowledge in two rounds. In Advances in Cryptology—CRYPTO '89, 9th Annual International Cryptology Conference, Santa Barbara, California, USA, Aug. 20-24, 1989, Proceedings, vol. 435 of Lecture Notes in Computer Science, pp. 526{544. Springer, 1989.
Intentionally Left Blank.
F. Garcia and B. Jacobs. Privacy-friendly energy-metering via homomorphic encryption. In Proceedings of the 6th International Workshop on Security and Trust Management, 2010.
J. Groth and A. Sahai. Efficient non-interactive proof systems for bilinear groups. Electronic Colloquium on Computational Complexity (ECCC), 14(053), 2007.
Y. Gurevich and I. Neeman. Dkal: Distributed-knowledge authorization language. In Proceedings of the 2008 21st IEEE Computer Security Foundations Symposium, CSF '08, pp. 149-162, Washington, DC, USA, 2008. IEEE Computer Society.
G. Hart. Nonintrusive appliance load monitoring. Proceedings of the IEEE, 80(12):1870-1891, Dec. 1992.
G. W. Hart. Residential energy monitoring and computerized surveillance via utility power flows. IEEE Technology and Society Magazine, Jun. 1989.
Y. Huang, D. Evans, J. Katz, and L. Malka. Faster secure two-party computation using garbled circuits. In 20th USENIX Security Symposium, San Francisco, CA, USA, Aug. 8-12, 2011, Proceedings. USENIX Association, 2011.
Y. Ishai, J. Kilian, K. Nissim, and E. Petrank. Extending oblivious transfers efficiently. In Advances in Cryptology—CRYPTO 2003, 23rd Annual International Cryptology Conference, Santa Barbara, California, USA, Aug. 17-21, 2003, Proceedings, pp. 145-161, 2003.
M. Jawurek, M. Johns, and F. Kerschbaum. Plug-in privacy for smart metering billing. S. Fischer-Hubner and N. Hopper, editors. Privacy Enhancing Technologies—11th International Symposium, PETS 2011, Waterloo, ON, Canada, Jul. 27-29, 2011. Proceedings, vol. 6794 of Lecture Notes in Computer Science, pp. 192-210. Springer, 2011.
M. Jawurek, M. Johns and K. Rieck. Smart metering de-pseudonymization. In ACSAC, pp. 227-236, 2011.
M. Jawurek and F. Kerschbaum. Fault-tolerant privacy-preserving statistics. In S. Fischer-Huebner and N. Hopper, editors, accepted at PETS, Lecture Notes in Computer Science. Springer, Jan. 2012.
M. S. Kiraz and B. Schoenmakers. A protocol issue for the malicious case of Yao's garbled circuit construction. In: In Proceedings of 27th Symposium on Information Theory in the Benelux, pp. 283-290, 2006.
V. Kolesnikov and T. Schneider. Improved garbled circuit: Free XOR gates and applications. In Automata, Languages and Programming, 35th International Colloquium, ICALP 2008, Reykjavik, Iceland, Jul. 7-11, 2008, Proceedings, Part II—Track B: Logic, Semantics, and Theory of Programming & Track C: Security and Cryptography Foundations, vol. 5126 of Lecture Notes in Computer Science, pp. 486-498. Springer, 2008.
K. Kursawe, G. Danezis, and M. Kohlweiss. Privacy-friendly aggregation for the smart-grid. S. Fischer-Hubner and N. Hopper, editors. Privacy Enhancing Technologies—11th International Symposium, PETS 2011, Waterloo, ON, Canada, Jul. 27-29, 2011. Proceedings, vol. 6794 of Lecture Notes in Computer Science, pp. 175-191. Springer, 2011.
H. Lam, G. Fung, and W. Lee. A novel method to construct taxonomy electrical appliances based on load signatures. Consumer Electronics, IEEE Transactions on, 53(2):653-660, May 2007.
C. Laughman, K. Lee, R. Cox, S. Shaw, S. Leeb, L. Norford, and P. Armstrong. Power signature analysis. Power and Energy Magazine, IEEE, 1(2):56-63, Mar.-Apr. 2003.
Y. Lindell and B. Pinkas. A proof of security of Yao's protocol for two-party computation. J. Cryptology, 22 (2):161-188, 2009.
M. A. Lisovich, D. K. Mulligan, and S. B. Wicker. Inferring personal information from demand-response systems. IEEE Security and Privacy, 8(1):11-20, 2010.
D. Malkhi, N. Nisan, B. Pinkas, and Y. Sella. Fairplay—secure two-party computation system. In Proceedings of the 13th USENIX Security Symposium, Aug. 9-13, 2004, San Diego, CA, USA, pp. 287-302. USENIX, 2004.
W. Mao. Guaranteed correct sharing of integer factorization with on-line shareholders. In Public Key Cryptography, First International Workshop on Practice and Theory in Public Key Cryptography, PKC '98, Pacifico Yokohama, Japan, Feb. 5-6, 1998, Proceedings, vol. 1431 of Lecture Notes in Computer Science, pp. 60-71. Springer, 1998.
M. M. Michael Backes and K. Pecina. Automated synthesis of privacy-preserving distributed applications. Accepted at 19th Annual Network and Distributed System Security Symposium (NDSS'12), Jan. 2012.
A. Molina-Markham, P. Shenoy, K. Fu, E. Cecchet, and D. Irwin. Private memoirs of a smart meter. In Proceedings of the 2nd ACM Workshop on Embedded Sensing Systems for Energy-Efficency in Building, BuildSys '10, pp. 61-66, New York, NY, USA, 2010. ACM.
P. Paillier. Public-key cryptosystems based on composite degree residuosity classes. In Advances in Cryptology—EUROCRYPT '99, International Conference on the Theory and Application of Cryptographic Techniques, Prague, Czech Republic, May 2-6, 1999, Proceeding, vol. 1592 of Lecture Notes in Computer Science, pp. 223-238. Springer, 1999.
T. P. Pedersen. Non-interactive and information-theoretic secure verifiable secret sharing. In Proceedings of the 11th Annual International Cryptology Conference on Advances in Cryptology, CRYPTO '91, pp. 129-140, London, UK, UK, 1992. Springer-Verlag.
R. Petrlic. A privacy-preserving concept for smart grids. In Sicherheit in vernetzten Systemen: 18. DFN Workshop, pp. B1-B14. Books on Demand GmbH, 2010.
A. Prudenzi. A neuron nets based procedure for identifying domestic appliances pattern-of-use from energy recordings at meter panel. In Power Engineering Society Winter Meeting, 2002. IEEE, vol. 2, pp. 941-946 vol. 2, 2002.

(56) References Cited

OTHER PUBLICATIONS

M. O. Rabin. How to exchange secrets by oblivious transfer. technical report tr-81. Technical report, Harvard Aiken Computation Laboratory, 1981.

A. Rial and G. Danezis. Privacy-preserving smart metering. Technical report, Microsoft Research, Nov. 2010.

C.-P. Schnorr. Efficient signature generation by smart cards. Journal of Cryptology, 4(3):161-174, 1991.

A. Schroepfer and F. Kerschbaum. Forecasting run-times of secure two-party computation. In Eighth International Conference on Quantitative Evaluation of Systems, QEST 2011, Aachen, Germany, Sep. 5-8, 2011, pp. 181-190. IEEE Computer Society, 2011.

A. C.-C. Yao. How to generate and exchange secrets. In Proceedings of the 27th Annual Symposium on Foundations of Computer Science, SFCS '86, pp. 162-167, Washington, DC, USA, 1986. IEEE Computer Society.

* cited by examiner

ZERO KNOWLEDGE PROOFS FOR ARBITRARY PREDICATES OVER DATA

BACKGROUND

The present invention relates to zero knowledge proofs, and in particular, to zero knowledge proofs for arbitrary predicates of private data.

Unless otherwise indicated herein, the approaches described in this section are not prior art to the claims in this application and are not admitted to be prior art by inclusion in this section.

The concepts of zero knowledge proofs may lend themselves to applications in the area of power distribution systems. The reading of electricity meters as well as other aspects of power distribution systems are being automated by the increasing use of smart grid technology in power distribution systems. Smart grids include communication links that allow service providers to communicate with various devices that are involved with electricity generation, distribution, and consumption. For example, smart grids allow service providers to communicate with smart meters that are located at consumer locations. Smart meters are replacements of traditional electricity meters. Smart meters and smart grids allow consumers' electricity consumption to be monitored remotely by the service provider, for example, via communications transmitted between the service provider and the smart meters. Thereby, smart meters and smart grids alleviate, at least in part, the historical need for humans to travel to traditional electricity meters to read the traditional electricity meters.

Smart grids also allow service providers to remotely communicate with power generation plants that generate the electricity that the consumers eventually consume. For example, service providers can remotely monitor the amount of electricity that power generation plants are producing and are projected to produce.

Service providers can use information collected from both smart meters and power generation plants to determine whether the electricity that is consumed exceeds, matches, or is falling behind the electricity that is produced by the power generation plants. Using the collected information, service providers can make a variety of timely informed decisions to improve electricity distribution between power generation plants and consumers so that electricity can be distributed both reliably and efficiently.

One technique that service providers can use with smart grids to improve electricity distribution between power generation plants and consumers is known as "demand response". Demand response allows for the issuance of demands and the issuance of responses that are responsive to the demands. For example, demand response allows for the issuance of a demand by a service provider to a customer and the issuance of a response by the customer to the service provider. Demands can be issued by service providers to consumers in an attempt to influence their electricity consumption.

To help ensure that consumers respond positively to meet demands, service providers may offer bonuses to consumers to encourage the consumers to meet the demands. The bonuses are provided to consumers who actually meet the demand. An example demand response scenario may include a service provider issuing demands (e.g., via a smart gird) to consumers to reduce electricity consumption for a given time period, and issuing bonus offers to those consumers whose electricity consumption meets the reduced electricity consumption. For example, the demand may be issued to the consumers to reduce electricity usage by 10% (e.g., a consumption target) for a day as compared to a previous day. More specifically, demands may be issued to the consumers to consume 10% less electricity in hourly time-slots between 7 PM and 10 PM as compared to the same time slots in the previous day. The service provider may offer bonuses for monetary reductions in an electricity bill if the demand is met.

Eventually, the service provider will have to verify whether the consumer has met the demand before the bonuses are issued. Verification of demands may be accomplished by collecting high-resolution smart-meter data from smart meters via the smart grid. The collection of such high-resolution smart-meter data from smart meters may, however, exposes consumers' private information to the service provider. More specifically, consumers' activities in their homes and businesses can be inferred from high-resolution smart-meter data based on known profiles of electricity usage. For example, the profiles of consumers' electricity consumption may reveal activities, such as watching television, running a dishwasher, sleeping, cooking, operating machinery, etc.

Many consumers want to keep their activities in their homes, businesses, and the like private. Therefore, the consumers do not want their high-resolution smart-meter data revealed to service providers so that they can preserve their privacy. To support the consumers' demands for privacy, service providers may attempt to learn whether a demand has been met without collecting the consumers' high-resolution smart-meter data. Various techniques exist for service providers to determine whether consumers meet a demand without exposing the consumers' high-resolution smart-meter data to the service provider. However, these techniques often are not efficient and/or are not strongly secure and may allow high-resolution smart-meter data to be exposed to the service providers.

SUMMARY

Embodiments of the present invention improve smart grids where private data remains private but is verified via zero knowledge proofs for arbitrary predicates over private data.

According to one embodiment, a method operable on a first computing device for proving that private data meets a criterion where the private data is not revealed includes transferring a first commitment and a second commitment to a second computing device. The first commitment represents a commitment to the private data and a first random number and the second commitment represents a commitment to a second random number and a third random number. The method further includes receiving a first challenge that is a challenge to the first and the second commitments from the second computing device. The first challenge is in encrypted form. The method further includes receiving a garbled circuit that includes a predicate function and a first support function in encrypted forms from the second computing device. The predicate function represents the criterion. The method further includes producing an evaluation result by evaluating the predicate function and the first support function of the garbled circuit using a first encryption result that represents the private data in encrypted form, a second encryption result that represents the second random number in encrypted form, and the first challenge. The evaluation result includes a first part based on the first encryption result, the second encryption result, and the first challenge and includes a second part based on the first encryption result. The first part is referred to as the first response, and the second part is referred to as the predicate result. The method further includes transferring the evaluation result to the second computing device, and receiving a second challenge from the second computing device.

The first challenge is an encrypted form of the second challenge. The method further includes producing a second response from a second support function using the second challenge, the first random number, and the third random number. The first support function is an encrypted form of the second support function. The method further includes transferring the second response to the second computing device. The first support function is a homomorphic mapping of a check function of the first and the second commitments. The predicate result over the private data is deemed to be accurately reported by the first computing device if a check function result of the check function is equal to a third commitment of the first response and the second response.

According to a specific embodiment, the method further includes receiving the first encryption result from an encryption of the private data based on an oblivious transfer protocol, and receiving the second encryption result from an encryption of the second random number based on the oblivious transfer protocol. The first commitment, the second commitment, the first challenge, the first response, and the second response are elements of a sigma protocol.

According to another specific embodiment, the method further includes receiving the first encryption result and the second encryption result from the second computing device. The first response is a response to the first challenge. The step of receiving the second challenge from the second computing device includes receiving the second challenge after the step of transferring the evaluation result to the second computing device.

According to another specific embodiment, the method further includes receiving a third support function from the second computing device. The step of producing the evaluation result includes producing the evaluation result by evaluating either the predicate function and the first support function using the first encryption result, the second encryption result, and the first challenge, or the predicate function and the third support function using the first encryption result, the first challenge, and the hidden information. The evaluation result includes either the first part and the second part, or the first part, the second part, and a third part based on the hidden information, the third part is referred to as the third response.

According to another specific embodiment, the method further includes generating a third commitment, wherein the third commitment is either a commitment to the predicate result and the first response, or the predicate result, the first response, and the third response, and transferring the third commitment to the second computing device.

According to another specific embodiment, the predicate function, the first support function, and the third support function in encrypted form constitute a garbled circuit.

According to another specific embodiment, the method further includes, subsequent to transferring the third commitment to the second computing device, receiving an open form of the garbled circuit, and determining the first challenge from the open form of the garbled circuit. The method further includes verifying from the open form of the garbled circuit that the garbled circuit is not configured to leak the private data. If the garbled circuit is not configured to leak the private data, the method includes transmitting the predicate result, the first response, and the third response to the second computing device. If the third response is an actual commitment for the predicate result, then the first response and the third response are deemed true.

According to another specific embodiment, the method further includes receiving the first commitment from a smart meter that is configured to meter electricity usage for a customer location.

According to another specific embodiment, the method further includes receiving the private data, and the first random numbers from the smart meter.

According to one embodiment, a non-transitory computer-readable storage medium comprising instructions for proving that private data meets a criterion where the private data is not revealed, wherein the instructions, when executed, are for controlling a computing device to be configured for: transferring a first commitment and a second commitment to a second computing device, wherein the first commitment represents a commitment to the private data and a first random number and the second commitment represents a commitment to a second random number and a third random number; receiving a first challenge that is a challenge to the first and the second commitments from the second computing device; receiving a garbled circuit for a predicate function and a first support function in encrypted form from the second computing device, wherein the predicate function represents the criterion; producing an evaluation result by evaluating the predicate function and the first support function of the garbled circuit using a first encryption result that represents the private data in encrypted form, a second encryption result that represents the second random number in encrypted form, and the first challenge, wherein the evaluation result includes a first part based on the first encryption result, the second encryption result, and the first challenge and includes a second part based on the first encryption result, the first part is referred to as the first response, and the second part is referred to as the predicate result; transferring the evaluation result to the second computing device; receiving a second challenge from the second computing device, wherein the first challenge is an encrypted form of the second challenge; producing a second response from a second support function using the second challenge, the first random number, and the third random number, wherein the first support function is an encrypted form of the second support function; and transferring the second response to the second computing device. The first support function is a homomorphic mapping of a check function of the first and the second commitments. The predicate result over the private data is deemed true if a check function result of the check function is equal to a third commitment of the first response and the second response.

According to one embodiment, computing device for proving that private data meets a criterion where the private data is not revealed includes a processor; and a computer-readable storage medium that comprises instructions for controlling the processor to be configured for: transferring a first commitment and a second commitment to a second computing device, wherein the first commitment represents a commitment to the private data and a first random number and the second commitment represents a commitment to a second random number and a third random number; receiving a first challenge that is a challenge to the first and the second commitments from the second computing device; receiving a garbled circuit for a predicate function and a first support function that are in encrypted forms from the second computing device, wherein the predicate function represents the criterion; producing an evaluation result by evaluating the predicate function and the first support function of the garbled circuit using a first encryption result that represents the private data in encrypted form, a second encryption result that represents the second random number in encrypted form, and the first challenge, wherein the evaluation result includes a first part based on the first encryption result, the second encryption result, and the first challenge and includes a second part based on the first encryption result, the first part is referred to as the first response, and the second part is referred to as the predicate result; transferring the evaluation result to the second computing device; receiving a second challenge from the second computing device; wherein the first challenge is an encrypted form of the second challenge; producing a second response from a second support function using the second challenge, the first random number, and the third random number, wherein the first support function is an encrypted form of the second support function; and transferring the second response to the second computing device. The first support function is a homomorphic mapping of a check function of the first and the second commitments. The predicate evaluation result over the private data is deemed true if a check function result of the check function is equal to a third commitment of the first response and the second response.

The following detailed description and accompanying drawings provide a better understanding of the nature and advantages of the present invention.

DETAILED DESCRIPTION

Described herein are techniques for zero knowledge proofs for arbitrary predicates over data. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
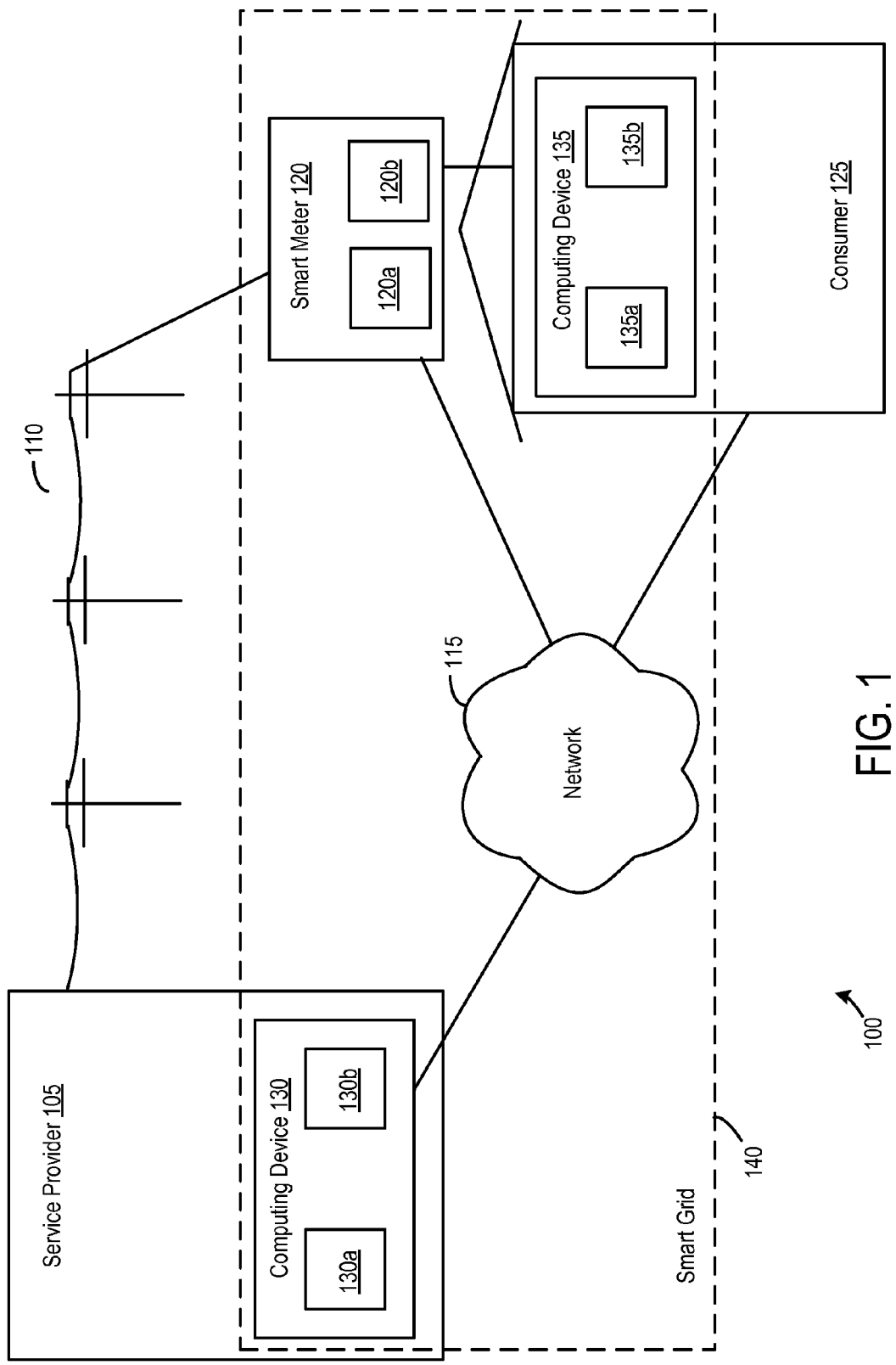
FIG. 1 illustrates a power distribution system in accordance with the present disclosure.

FIG. 1 illustrates a power distribution system 100 that includes a service provider 105, an electricity distribution grid 110, a communication network 115, a smart meter 120, and at least one consumer 125, according to one embodiment. Service provider 105 may be an electricity provider that provides electricity to consumer 125 via electricity distribution grid 110. Consumer 125 may include a variety of entities that consume electricity, such as a house, a building, or the like.

Smart meter 120 may be located at the consumer's location and may meter the consumer's electricity consumption. Smart meter 120 may meter electricity consumption in a manner similar to a traditional electricity meter by collecting electricity consumption information (referred to herein as "meter data") over time. Unlike traditional electricity meters, which are typically analog meters, smart meter 120 may be a digital meter and may generate meter data in digital form. The meter data may be relatively high-resolution data. For example, smart meter 120 may generate meter data in one second increments, one minute increments, or the like.

In addition to metering electricity consumption, smart meter 120 can also communicate with service provider 105 and/or consumer 125 via communication network 115. Specifically, service provider 105 may include a computing device 130 and consumer 125 may include a computing device 135 that can communicate with each other and with the smart meter 120 via communication network 115.

According to one embodiment, computing device 130 includes a processor 130a and a memory device 130b. Similarly, computing device 135 may include a processor 135a and a memory device 135b. Smart meter 120 may also include a processor 120a and a memory device 120b. Memory devices 130b, 135b, and 120b may each be a non-transitory computer readable storage medium. Memory device 130b, 135b, and 120b may each store computer code that is executable by their respectively associated processors 130a, 135a, and 120a. Computer code stored in computing devices 130 and 135 and in smart meter 120 may embody various methods described herein.

According to one embodiment, communication network 115 may be composed of a variety of communication networks such as one or more intranets, the Internet, etc. Communication network 115 in combination with smart meter 120, computing device 130, and/or computing device 135 may constitute a smart grid 140. Smart grid 140 allows service provider 105 to gather and act on information, such as information about the behaviors of electricity suppliers and consumer 125 (e.g., via smart meter 120) in an automated fashion. For example, smart grid 140 allows service provider 105 to implement demand response techniques which the service provider 105 may use to attempt to influence electricity consumption by the consumer 125 to improve efficiency, reliability, economics, and sustainability of electricity production.

Demand response techniques are presently described in further detail according to various embodiments. According to a particular embodiment, service provider 105 may issue a demand to one or both of consumer 125 and smart meter 120. The demand may include target information that represents a consumption target of electricity that the consumer is encouraged to consume. A consumption target may be expressed as an amount of electricity in a given period of time, for example, so many kilowatts between 7 AM and 3 PM during weekdays, or so many kilowatts on the weekends, and so on.

Service provider 105 may offer a bonus to the consumer 125 to influence the consumer's electricity consumption habits to meet the consumption target. Bonus information that represents the bonus may be transmitted to the consumer 125 and/or the smart meter 120 via communication network 115. The bonus information may be transmitted with the demand or in a separate communication.

Before providing the bonus to the consumer 125, the service provider 105 will verify whether the consumer 125 has met the consumption target. The service provider 105 might not be allowed to collect the meter data directly from smart meter 120 to verify whether the consumer 125 has met the consumption target because the meter data may be considered private data. Specifically, the service provider 105 might not be allowed to collect the meter data directly from the smart meter 120 to inhibit the service provider 105 from inferring the activities of the consumer 125 from the meter data.

Embodiments are described herein that allow service provider 105 to verify that the consumer 125 has met the consumption target without the meter data from smart meter 120 being exposed to the service provider 105. While the described embodiments are described with respect to smart grid technology such as power distribution system 100, the described embodiments may be applied to a variety of technologies and systems that involve private or otherwise protected data, which nonetheless needs to be somehow accessible so that it can be evaluated.

Zero Knowledge Proof

Embodiments are presently described that allow the computing device 130 of the service provider 105 to verify that the private data (such as meter data) held by the consumer 125 on computing device 135 meets a criterion (such as a consumption target) using a demand/response protocol. The criterion may be provided by computing device 130 to computing device 135 in the demand. According to one embodiment, the private data is not exposed by computing device 135 to computing device 130.

Figure 2:
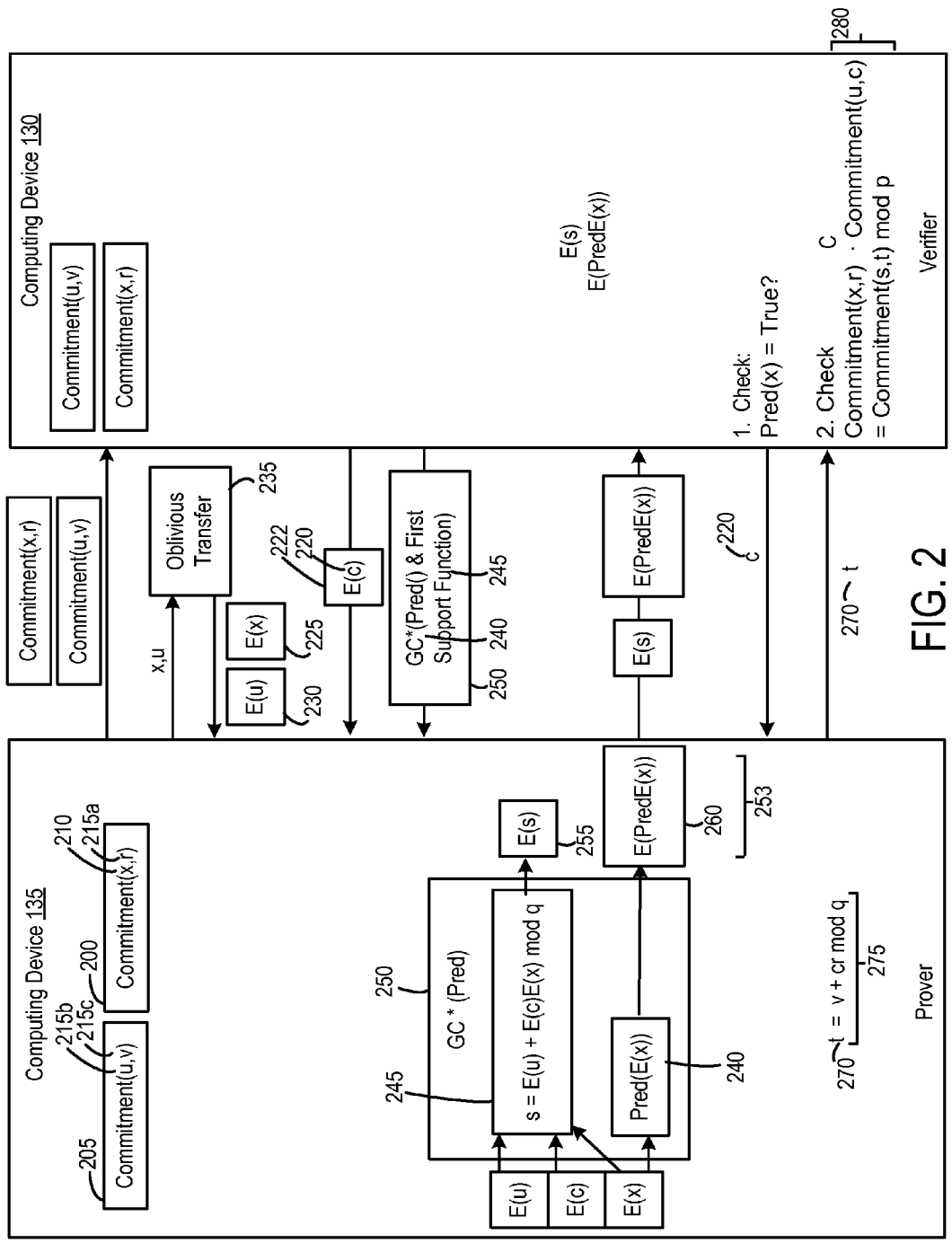
FIG. 2 depicts a high-level flow diagram illustrating a process for zero-knowledge proof between computing devices in accordance with the present disclosure.
Figure 3:
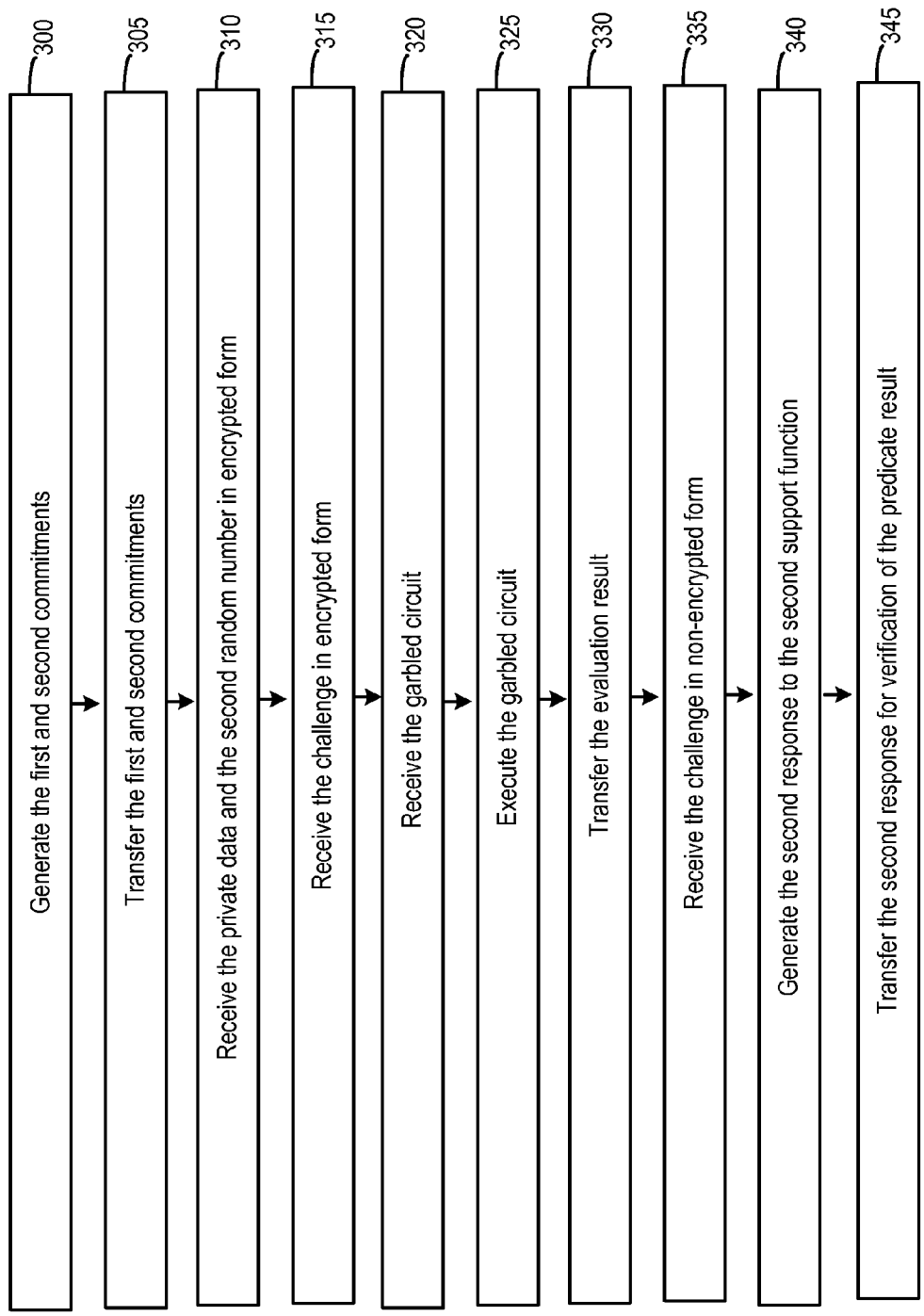
FIG. 3 depicts a workflow of the process shown in FIG. 2.

Reference is currently made to FIGS. 2 and 3 in combination. FIGS. 2 and 3 both depict high-level flow diagrams of a method for proving that the private data of the consumer 125, held on computing device 135, meets a criterion where the private data is not exposed to the computing device 130. FIG. 2 depicts, among other things, communications between computing devices 130 and 135, and FIG. 3 depicts numbered steps for the method. The high-level flow diagrams represent an example embodiment and those of skill in the art will understand that various steps of the high-level flow diagram may be combined and/or added without deviating from the scope and the purview of the embodiment.

The computing device 135 of the consumer 125 is represented on the left side of FIG. 2, and the computing device 130 of the service provider 105 is represented on the right side of FIG. 2. In the following description and in FIG. 2, computing device 135 is sometimes referred to as the "prover", and computing device 130 is sometimes referred to as the "verifier". The terms prover and verifier are often used in the security and cryptography arts for entities that, respectively, prove that private data meets a criterion and verify that the proof offered by the prover is true. The proof that the private data meets a criterion includes the use of a predicate over the private data, where a predicate function for the predicate is represented as a Boolean (or logical) expression of the criterion. An example of a predicate function is described in further detail as the method is described.

Reference is now made to the various steps shown in FIGS. 2 and 3. At 300, first and second commitments 200 and 205 are generated. First commitment 200 is designated as commitment(x,r) in FIG. 2 and second commitment 205 is designated as commitment(u,v) in FIG. 2. First commitment 200 is a commitment to: i) the private data (e.g., meter data), which is labeled with reference number 210 and designated by "x", and ii) a first random number 215a, which is designated by "r". Second commitment 205 is a commitment to: i) a second random number 215b, which is designated by "u", and ii) a third random number 215c, which is designated by "v". In some embodiments, first and second commitments 200 and 205 may be Pederson commitments. Pederson commitments are described separately below.

According to one embodiment, the first commitment 200 may be generated by one device and the second commitment 205 may be generated by another device. For example, smart meter 120 may generate the first commitment 200 and transfer the first commitment 200 to computing device 135. Prior to transmitting the first commitment to the computing device 135, the smart meter 120 may digitally sign the first commitment 200 so that computing device 135 can verify that the first commitment 200 is transmitted by the smart meter 120. According to this embodiment, the smart meter 120 may generate the first random number 215a used for generating the first commitment. The smart meter 120 may then transfer private data 210 and the first number 215a to computing device 135. The private data 210 and the first random number 215a may be transferred to computing device 135 along with the first commitment. Computing device 135 may generate the second and the third random numbers 215b and 215c, and may use the second and the third random numbers 215b and 215c to generate the second commitment 205.

According to various alternative embodiment, the first and the second commitments 200 and 205 may be generated by computing device 135, or may be generated by another computing device and transferred to computing device 135. According to a specific embodiment, first and second commitments 200 and 205 are generated by smart meter 120, and are transferred to computing device 135 from smart meter 120. According to this embodiment, smart meter 120 generates the first, the second, and the third random numbers 215a, 215b, and 215c used for generating first and second commitments 200 and 205. The smart meter 120 may then transfer private data 210 and the first, the second and the third random numbers 215a, 215b, and 215c to computing device 135. The private data 210 and the first, the second and the third random numbers 215a, 215b, and 215c may be transferred to computing device 135 along with the first and the second commitments. If the private data 210 and the first, the second and the third random numbers 215a, 215b, and 215c are transferred to computing device 135, but the first and the second commitments are not transferred, then the computing device 135 may then generate the first and second commitments 200 and 205.

At 305, first and second commitments 200 and 205 are transferred to computing device 130, for example, via communication network 115 from computing device 135.

At 310, computing device 135 receives private data 210 and second random number 215b in encrypted form as encrypted data 225 and 230, respectively, from computing device 130. The encrypted data 225 and 230 are respectively designated as E(x) and E(u) in FIG. 2. The encrypted data 225 and 230 may be received by computing device 135 from computing device 130 using an oblivious transfer protocol 235. Oblivious transfer protocol 235 may be applied to private data 210 and second random number 215b to generate the encrypted data 225 and 230. According to one embodiment, computing device 130 provides the encryption functions for oblivious transfer protocol 235 for encrypting private data 210 and second random number 215b.

At 315, computing device 135 receives a challenge 220 to first and second commitments 200 and 205 from computing device 130. Challenge 220 is designated by "c" in FIG. 2. Challenge 220 may be received in encrypted form as encrypted data 222, which is designated as E(c) in FIG. 2. Computing device 130 may generate challenge 220 and encrypted data 222 based on first and second commitments 200 and 205 received from computing device 135.

At 320, computing device 135 receives, a garbled circuit 250 that includes the encrypted forms of the predicate function (labeled 240 in FIG. 2) and a first support function 245. Predicate function 240 is designated as Pred( ) in FIG. 2. First support function 245 may be expressed as: s=E(u)+E(c)E(x) mod q. Garbled circuit 250 may be generated by computing device 130 and provided to computing device 135. Additional details about garbled circuits are given below.

At 325, computing device 135 executes the garbled circuit 250 and more specifically executes the predicate function 240 and first support function 245 by evaluating the garbled circuit 250. Generally, computing device 135 executes the garbled circuit 250 using encrypted data 225, 230, and 222. According to a specific embodiment, computing device 135 uses encrypted data 225 to execute predicate function 240, and uses encrypted data 225, 230, and 222 to execute first support function 245. Garbled circuit 250 controls the use of encrypted data 225 for executing predicate function 240, and the use of encrypted data 225, 230, and 222 for executing first support function 245. Therefore, computing device 135 may not use two different values of encrypted data 225 for executing predicate function 240 and first support function 245.

Based on the execution of the garbled circuit 250 at step 325, computing device 135 produces an evaluation result 253. Evaluation result 253 includes a first response 255 that is a result from computing device 135 executing first support function 245 in encrypted form. First response 255 is indicated by the expression E(s) in FIG. 2.

Evaluation result 253 also includes a predicate result 260 that is a result from computing device 135 executing predicate function 240 in encrypted form. Predicate result 260 is labeled E(pred(E(x))) in FIG. 2.

At 330, computing device 135 transfers evaluation result 253 to computing device 130.

At 335, computing device 135 receives challenge 220 from computing device 130 in non-encrypted form.

At 340, computing device 135 produces a second response 270 from a second support function 275 using challenge 220, first random number 215a, and third random number 215c. Second support function 275 may be expressed as: t=v+cr mod q. Second response 270 is the value t in second support function 275. The second support function 275 is an unencrypted form of the first support function 245 but different parameters are used (e.g., v,c,r versus E(u), E(c), E(x)) to execute the second support function 275. According to one embodiment, the first commitment, the second commitment, the first challenge, the first response, and the second response are elements of a sigma protocol.

At 345, computing device 135 transfers second response 270 to computing device 130.

According to one embodiment, after computing device 130 receives first commitment 200 (at 305), second commitment 205 (at 305), evaluation result 253 (i.e., first response 255 and predicate result 260 received at 330), and second response 270 (at 345), as described above, computing device 130 may determine whether the predicate result is true or false (i.e., whether the private data 210 meets the criterion that is represented by the predicate function 240). Computing device may decrypt the predicate result provided by computing device 235 at 330. If the predicate result is false, the private data may not meet the criteria and no further determination may be made by computing device 120. Alternatively, if the predicate result 260 is true, computing device may thereafter determine whether the predicate result 260 is accurately reported by computing device 135. That is, computing device 130 may verify that predicate result 260 has not been tampered with by computing device 135. For example, computing device 130 may verify that predicate result 260 is actually true, if computing device 135 purports that predicate result 260 is true. According to some embodiments, computing device 130 may verify that predicate result 260 is actually false, if computing device 135 purports that predicate result 260 is false.

According to one embodiment, if computing device 130 determines that the predicate result 260 is true, then computing device 130 may execute a check function 280 to determine whether the predicate results 260 has been accurately reported by the computing device 135. Specifically, the check function 280 generates a check result that indicates whether computing device 135 computing device 135 used the same private data 210 for the first commitment 200 and for the oblivious transfer protocol 235, or whether computing device used different private data 210 for the first commitment 200 and the oblivious transfer protocol 235. The check result is said to inherently indicate whether predicate result 260 is accurately reported by computing device 135 because computing device 135 does not know private data 210 and hence cannot evaluate predicate function 240 directly from private data 210.

According to one embodiment, check function 280 is expressed as: commitment$(x,r)^C$·commitment$(u,v)$=commitment$(s,t)$ mod p. Check function 280 is a homomorphic mapping of the first support function 245 with multiplication in the first support function 245 mapped to an exponential and addition mapped to multiplication. If the left expression of check function 280 does not equal the right expression of check function 280, then computing device 130 cannot trust that the predicate function has been computed over the actual private data 210.

Verification of the predicate result 260 is presently described in relationship to the demand issued by service provider 105. As described above, predicate function 240 is a Boolean expression of the demand. The predicate result 260 represents whether private data 210 resolves to true or false when operated on by the Boolean expression. That is, the predicate result 260 indicates whether private data 210 has met the demand. If the demand is met, then the customer has met the consumption target for electrical consumption issued by server provider 105, according to one embodiment. If service provider 105 has offered a bonus for meeting the consumption target, then the service provider 105 may feel confident in providing the bonus to the customer. Alternatively, if the demand is not met, then the customer has not met the consumption target for electrical consumption, and the service provider 105 may feel confident in not providing the bonus to the customer.

The foregoing described method for proving that private data 120 meets the demand is an example of a zero knowledge proof, where private data 120 of the customer is not exposed to service provider 105. Service provider 105 may, however, be able to ascertain private data 120 if the service provider 105 acts "maliciously." Service provider 105 may act maliciously by providing a "leaky" garbled circuit to computing device 135 (e.g., at step 320). If the garbled circuit is designed to leak, then computing device 130 can learn private data 120 from predicate result 260. A method is described below for a "real" zero knowledge proof that is less susceptible to an attack by service provider 105. The following describes a method for allowing computing device 135 to verify whether the garbled circuit is designed to leak prior to transmitting the predicate result to computing device 130. If computing device 135 determines that the garbled circuit is not designed to leak, then computing device 135 can decide to transmit the private data computing device 130. Alternatively, if computing device 135 determines that the garbled circuit is designed to leak, then computing device 135 can decide not to transmit the private data computing device 130.

Real Zero Knowledge Proof

Figure 4:
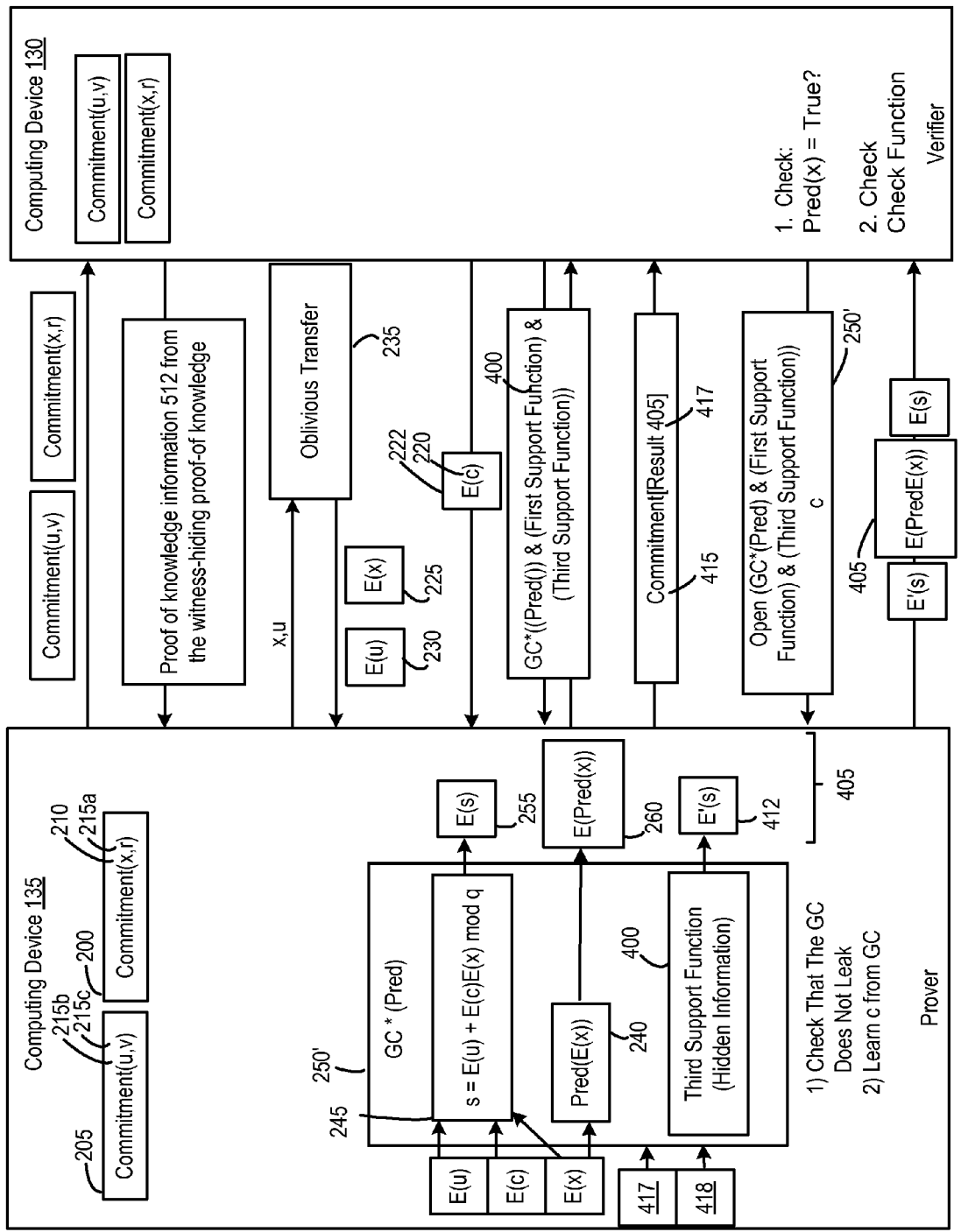
FIG. 4 depicts a high-level flow diagram illustrating another process for zero-knowledge proof between computing devices in accordance with the present disclosure.
Figure 5:
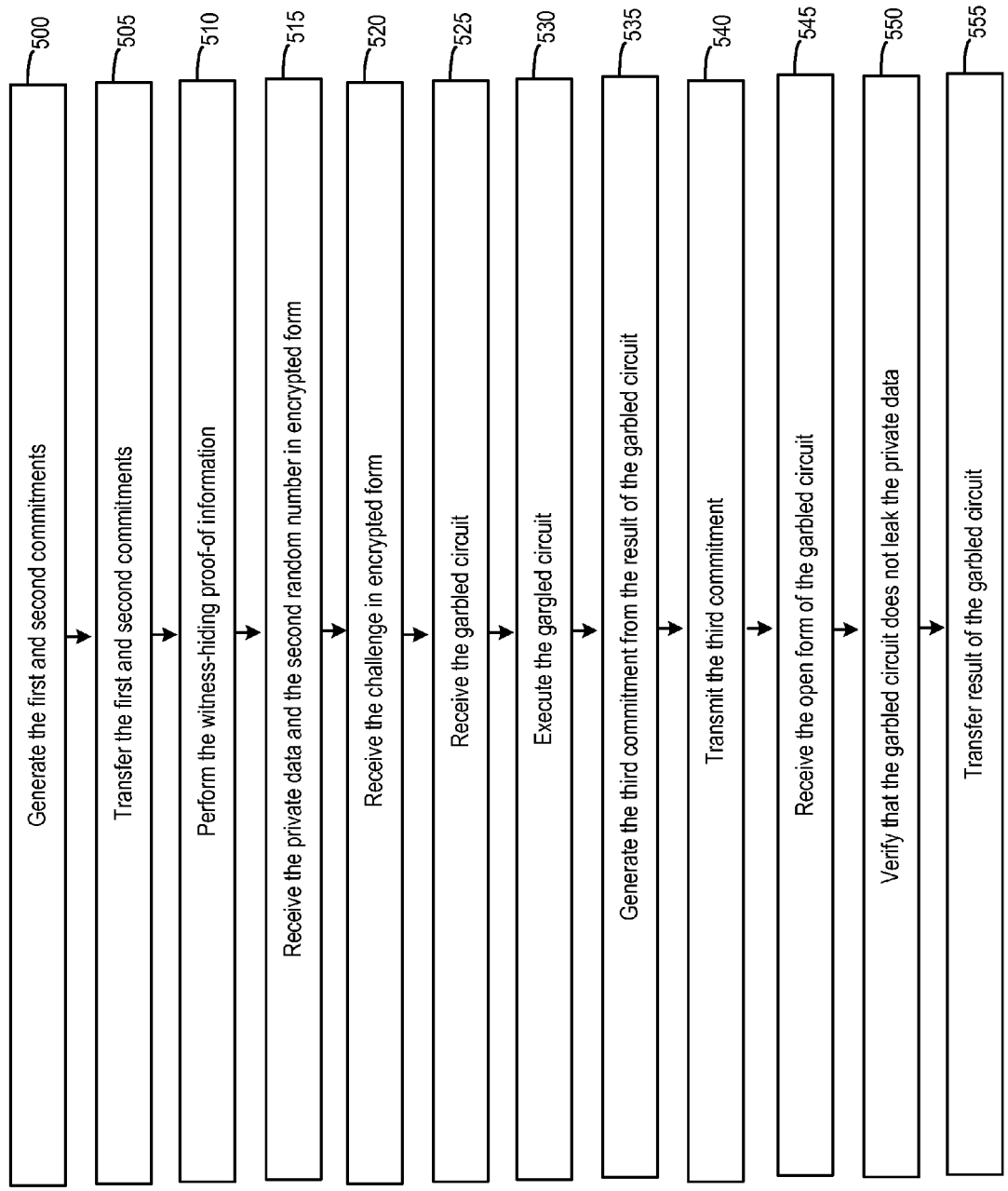
FIG. 5 depicts a workflow of the process shown in FIG. 4.

Reference is currently made to FIGS. 4 and 5 in combination where the figures depict a method for a real zero knowledge proof according to one embodiment. More specifically, FIGS. 4 and 5 both depict high-level flow diagrams of a method for proving that private data 120 of the customer that is held on computing device 135 meets a criterion where private data 120 is not exposed to computing device 130 and where the method is not susceptible to an attack from a leaky garbled circuit. FIG. 4 depicts, among other things, communications between computing devices 130 and 135, and FIG. 5 depicts numbered steps for the method. The same reference numbers used above for FIG. 2 are used for FIG. 4 to identify the same or substantially similar elements. The high-level flow diagrams represents an example embodiment and those of skill in the art will understand that various steps of the high-level flow diagram may be combined and/or added without deviating from the scope and the purview of the embodiment.

At 500, first and second commitments 200 and 205 are generated.

At 505, first and second commitments 200 and 205 are transferred to computing device 130, for example, via communication network 115.

At 510, computing device 135 and 130 may perform a witness-hiding proof-of knowledge with reversed roles, where computing device 130 proves to computing device 135 that for some α, computing device 130 knows a witness β for a hard relationship R so that (α, β)∈R. In the witness-hiding proof-of knowledge, computing device 135 does not learn the knowledge from computing device 130, but receives proof-of knowledge information 512 that for some α, computing device 130 knows a witness β for a hard relationship R so that (α, β)∈R. After computing device 130 performs the witness-hiding proof of knowledge in reversed roles (i.e., computing device 130 proves to computing device 135 knowledge of (β so that (α, β)∈R), then computing device 135 proves to computing device 130 that computing device 135 knows a witness β' such that (α, β')∈R.

At 515, computing device 135 receives private data 120 and the second random number 215b in encrypted form as encrypted data 225 and 230, respectively. The encrypted data 225 and 230 may be received by computing device 135 from computing device 130 as a result of oblivious transfer protocol 235 applied to private data 210 and second random number 215b.

At 520, computing device 135 receives challenge 220 in encrypted form as encrypted data 222.

At 525, computing device 135 receives a garbled circuit 250' from computing device 130. Garbled circuit 250' includes the encrypted forms of the predicate function 240, the first support function 245, and a third support function 400. Third support function 400 is a support function that allows computing device 135 to also prove knowledge of β.

At 530, computing device 135 executes (or evaluates) garbled circuit 250' to generate a result 405 by evaluating the predicate function 240, the first support function 245, and the third support function 400. Generally, computing device 135 executes the garbled circuit 250' using encrypted data 225, 230, and 222, a decision bit 417, and a challenge 418. According to a specific embodiment, computing device 135 uses encrypted data 225 to evaluate predicate function 240, and uses encrypted data 225, 230, and 222 to evaluate first support function 245. Computing device 135 generates the decision bit 417 which indicates whether computing device 135 can answer first support function 245 or third support function 400. Computing device 135 also generates the challenge 418 which is a challenge to garbled circuit 250', and is a challenge for either the first support function 245 or that third support function 400 that computing device 135 cannot honestly answer. The garbled circuit 250' uses decision bit 417, challenge 220, and challenge 418 to generate a new challenge for the support function (either first support function 245 or third support function 400) that computing device 135 can honestly answer. However, computing device 135 will only be able to answer the first support function 245 because computing device 135 does not know β and cannot answer the third support function 400.

Result 405 includes the predicate result 260, the first response 255, and a third response 412. The third response 412 is indicated by the expression E'(s) in FIG. 4. Third response 412 is a result from computing device 135 evaluating third support function 400 in encrypted form in the garbled circuit 250'.

At 535, computing device 135 generates a third commitment 415. Third commitment 415 is a commitment to the result 405.

At 540, computing device 135 transmits third commitment 415 to computing device 130.

At 545, after computing device 135 transmits the third commitment 415 to computing device 130, computing device 135 receives an open form of garbled circuit 250' from computing device 130. According to a specific embodiment, computing device 135 receives the garbled circuit 250' and a key for decrypting the garbled circuit 250'. The computing device 135 may use the key to decrypt (i.e., open) garbled circuit 250' to generate the open form of the garbled circuit 250'.

At 550, using the open form of the garbled circuit 250', computing device 135 determines whether garbled circuit 250' is designed to leak private data 120 to computing device 130. At 550, computing device 135 also extracts challenge 220 from the open form of garbled circuit 250'.

At 555, if computing device 135 determines that garbled circuit 250' is not designed to leak private data 210, then the computing device 135 transmits result 405 to computing device 130. Otherwise, if computing device 135 determines that garbled circuit 250' is designed to leak private data 210, then the computing device 135 may not transmit either evaluation result 253 or evaluation result 410 to computing device 130.

According to one embodiment, computing device 130 evaluates check function 280, to determine whether the predicate result 260 is accurately reported by computing device 135. That is, by evaluating check function 230, computing device 130 can determine whether computing device 135 used the same private data 210 for the first commitment 200 and for the oblivious transfer protocol 235, or whether computing device used different private data 210 for the first commitment 200 and the oblivious transfer protocol 235. More specifically, if the left expression of check function 280 does not equal the right expression of check function 280, then computing device 130 cannot trust that the predicate has been computed over the actual private data 210.

Pederson Commitments

Pederson commitments are briefly described below. In general, a commitment is a cryptographic tool with two functions:

Commit(x, r)→c, takes as input the value x and the random number r, and produces the commitment c.

Open(c, x, r) T/⊥, takes as input a commitment c, a value x and a random number r. It outputs T, if c is indeed a commitment to x and ⊥, if not.

Commitments have Two Security Properties:

Hiding: Given c it is hard to compute x.

Binding: Given c, x and r it is hard to compute an x'≠x and r', such that

Open(c; x; r)=T, i.e. c is a commitment for x' as well.

Pedersen commitments operate over a group G with prime order p. g and h are two generators of G with order q and q|p. $\log_g h$ must be unknown to the committing party. Pedersen commitments are computed as follows:

$$\text{Commit}(x, r): c = g^x h^r \mod p$$

$$\text{Open}(c, x, r): c \stackrel{?}{=} g^x h^r \stackrel{?}{=} c \stackrel{?}{=} \text{Commit}(x, r)$$

Pedersen commitments are homomorphisms on known-order groups, which is property used in various embodiments described herein.

Garbled Circuits

A garbled circuit ($GC_f$) provides a method and functions for secure function evaluation (SFE). The garbled circuit method includes encrypting a Boolean circuit that implements a function f (e.g., the predicate function that represents the criterion) on inputs (e.g., the private data), in such a way that the function can be evaluated in its encrypted form with encrypted inputs. How an evaluator (e.g., computing device 135) obtains encrypted input bits for inputs is explained below.

A garbled circuit $GC_f$ includes the encryption of a Boolean circuit $C_f$ that implements the function f. The Boolean circuit $C_f$ consists of wires (e.g., internal wires) that connect gates and of input wires and output wires. The states of the input wires and the output wires represent the input and the outputs of the function f, respectively. The gates are represented by truth-tables that, for respective states of incoming wires, indicate the outgoing wire's state. According to a specific embodiment, and without loss of generality, an assumption is made that every gate has two incoming wires and one outgoing wire.

According to one embodiment, garbled circuits 250 and 250' are augmented garbled circuits $GC_{pred}^h$ takes x, u as the prover's inputs and challenge $c \in Z_q$ from the verifier and outputs $h(x, u, c) = (s = u + cx \mod q)$. The predicate function (i.e., $Pred(x)$) outputs true iff (if and only if) the predicate holds for the private data x, and outputs false otherwise. Furthermore, the verifier creates respective ciphertexts $E_f(c)$ for use in $GC_{pred}^h$. Then the verifier sends this message to P: $m_1 = GC_{pred}^h E_f(c)$.

The following description of wire labels and truth tables describes an encryption method and an encryption function where the encryption function uses $C_f$ to create $GC_f$:

Wire Labels

Every wire i of $C_f$ is assigned two t-bit strings $v_i^0$ and $v_i^1$ representing the two states this wire an take on. Further, a permutation bit $p_i$ is randomly chosen. Then is wire labels are: $w_i^0 = v_i^0 \| (0 \oplus p_i)$ and $w_i^1 = v_i^1 \| (0 \oplus p_i)$.

Truth Tables

Let $g^*(x, y)$ be the truth table look-up function for gate g and for states x, y of incoming gates i and j and outgoing gate k. For every entry (x, y) in g's truth table let $x' = x \oplus p_i$ and $y' = y \oplus p_j$. Let OWHF( ) be a one-way hash function, then the encrypted truth table's look-up function $g^*$ is:

$$g^*(x,y) = \text{OWHF}(v_i^x \| k \| x' \| y') \oplus w_k^{g(x,y)} \oplus \text{OWHF}(v_j^y \| k \| x' \| y')$$

That means, the wire label of the outgoing wire k for the respective state indicated by $g(x,y)$, $w_k^{g(x,y)}$ is encrypted under the wire labels for the respective input states $w_i^x$ and $w_j^y$. As a final step, the entries of $g^*$ are swapped: if $p_i = 1$, then swap the first two entries. If $p_j = 1$ then swap the first and the third entries.

The final GC consists of the encrypted truth tables and information about their interconnections with wires. Wire labels are known to the creator but are unknown to the evaluator. According to the specific embodiments described herein, the creator corresponds to the verifier and the evaluator corresponds to the prover.

Evaluation is presently described. The evaluator uses oblivious transfers to obtain wire labels for its private input bits of its input values. Then, given the wire labels $w_i$ and $w_j = v_j \| x$ for incoming wires i, j to gate g the evaluator of the GC uses x, y to find the respective entry in this gate's encrypted truth table and decrypts it:

$$Dec(g^*(g^*(x,y)) = \text{OWHF}(v_i^x \| k \| y) \oplus g^*(x,y) \oplus \text{OWHF}(v_j^y \| k \| x \| y)$$

This gives the evaluator the wire label of this gate's outgoing gate k. Starting from the input wire labels the evaluator repeats this until he obtains wire labels for the GC's output wires.

Various improvements exist for the construction of GCs that improve performance of evaluation. For example, XOR-gates can be implemented "for free", for example, without creating hashes over incoming wire labels. This can be accomplished, if for all wire labels the following holds for the same R: $w_k^0 = w_k^1 \oplus R$. An XOR-gate's outgoing wire label is chosen as $w_i^x \oplus w_j^y$ for x, $y \in 0,1$.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method operable on a first computing device for proving that private data meets a criterion where the private data is not revealed, the method comprising:

transferring a first commitment and a second commitment to a second computing device, wherein the first commitment represents a commitment to the private data and a first random number and the second commitment represents a commitment to a second random number and a third random number;

receiving a first challenge that is a challenge to the first and the second commitments from the second computing device;

receiving a garbled circuit for a predicate function and a first support function that are in encrypted forms from the second computing device, wherein the predicate function represents the criterion;

producing an evaluation result by evaluating the predicate function and the first support function of the garbled circuit using a first encryption result that represents the private data in encrypted form, a second encryption result that represents the second random number in encrypted form, and the first challenge, wherein the evaluation result includes a first part based on the first encryption result, the second encryption result, and the first challenge and includes a second part based on the first encryption result, the first part is referred to as the first response, and the second part is referred to as the predicate result;

transferring the evaluation result to the second computing device;

receiving a second challenge from the second computing device;

producing a second response from a second support function using the second challenge, the first random number, and the third random number; and transferring the second response to the second computing device, wherein:

the first support function is a homomorphic mapping of a check function of the first and the second commitments, and the predicate result over the private data is deemed true if a check function result of the check function is equal to a third commitment of the first response and the second response.

2. The method of claim 1, further comprising:

receiving the first encryption result from an encryption of the private data based on an oblivious transfer protocol; and receiving the second encryption result from an encryption of the second random number based on the oblivious transfer protocol.

3. The method of claim 1, wherein the first commitment, the second commitment, the first challenge, the first response, and the second response are elements of a sigma protocol.

4. The method of claim 1, further comprising receiving the first encryption result and the second encryption result from the second computing device.

5. The method of claim 1, wherein the first response is a response to the first challenge.

6. The method of claim 1, wherein the first challenge is an encrypted form of the second challenge.

7. The method of claim 1, wherein the step of receiving the second challenge from the second computing device includes receiving the second challenge after the step of transferring the evaluation result to the second computing device.

8. The method of claim 1, further comprising performing a witness-hiding proof-of knowledge with reversed roles, wherein the second computing device proves to the first computing device that for some $\alpha$, second computing device knows a witness $\beta$ for a hard relationship R so that $(\alpha, \beta) \in R$.

9. The method of claim 8, wherein in the witness-hiding proof-of knowledge, first computing device does not learn from the second computing device the knowledge $\beta$ that the second computing device is proving to the first computing device.

10. The method of claim 8, wherein:

the garbled circuit includes a third support function for the witness-hiding proof-of knowledge, the step of producing the evaluation result includes producing the evaluation result by evaluating the predicate function and the first support function using the first encryption result, the second encryption result, and the first challenge, and by evaluating the third support function based on the witness-hiding proof-of knowledge, and the evaluation result includes the first part, the second part, and a third part based on the third support function, the third part is referred to as the third response.

11. The method of claim 10, further comprising:

generating a third commitment, wherein the third commitment is a commitment to the predicate result, the first response, and the third response; and transferring the third commitment to the second computing device.

12. The method of claim 11, further comprising, wherein subsequent to transferring the third commitment to the second computing device:

receiving an open form of the garbled circuit;

determining the first challenge from the open form of the garbled circuit;

verifying from the open form of the garbled circuit that the garbled circuit is not configured to leak the private data; and if the garbled circuit is not configured to leak the private data, transmitting the evaluation result to the second computing device, wherein if the third response is an actual commitment for the predicate result, then the first response and the third response are deemed true.

13. The method of claim 1, further comprising receiving the first commitment and the second commitment for a smart meter that is configured to meter electricity usage for a customer location.

14. The method of claim 13, further comprising receiving the private data and the first from the smart meter.

15. A non-transitory computer-readable storage medium comprising instructions for proving that private data meets a criterion where the private data is not revealed, wherein the instructions, when executed, are for controlling a computing device to be configured for:

transferring a first commitment and a second commitment to a second computing device, wherein the first commitment represents a commitment to the private data and a first random number and the second commitment represents a commitment to a second random number and a third random number;

receiving a first challenge that is a challenge to the first and the second commitments from the second computing device;

receiving a garbled circuit for a predicate function and a first support function that are in encrypted forms from the second computing device, wherein the predicate function represents the criterion;

producing an evaluation result by evaluating the predicate function and the first support function of the garbled circuit using a first encryption result that represents the private data in encrypted form, a second encryption result that represents the second random number in encrypted form, and the first challenge, wherein the evaluation result includes a first part based on the first encryption result, the second encryption result, and the first challenge and includes a second part based on the first encryption result, the first part is referred to as the first response, and the second part is referred to as the predicate result;

transferring the evaluation result to the second computing device;

receiving a second challenge from the second computing device;

producing a second response from a second support function using the second challenge, the first random number, and the third random number; and transferring the second response to the second computing device, wherein:

the first support function is a homomorphic mapping of a check function of the first and the second commitments, and the predicate result over the private data is deemed true if a check function result of the check function is equal to a third commitment of the first response and the second response.

16. The non-transitory computer-readable storage medium of claim 15, wherein the instructions, when executed, are for further controlling the computing device to be configured for:

receiving the first encryption result from an encryption of the private data based on an oblivious transfer protocol; and receiving the second encryption result from an encryption of the second random number based on the oblivious transfer protocol.

17. The non-transitory computer-readable storage medium of claim 15, wherein the instructions, when executed, are for further controlling the computing device to be configured for performing a witness-hiding proof-of knowledge with reversed roles, wherein the second computing device proves to the first computing device 135 that for some $\alpha$, second computing device knows a witness $\beta$ for a hard relationship R so that $(\alpha, \beta) \in R$, and wherein in the witness-hiding proof-of knowledge, computing device does not learn from computing device the knowledge $\beta$ that the computing device is proving to the computing device 135.

18. The non-transitory computer-readable storage medium of claim 17, wherein:
the garbled circuit includes a third support function for the witness-hiding proof-of knowledge,
the step of producing the evaluation result includes producing the evaluation result by evaluating the predicate function and the first support function using the first encryption result, the second encryption result, and the first challenge, and by evaluating the third support function based on the witness-hiding proof-of knowledge, and
the evaluation result includes the first part, the second part, and a third part based on the third support function, the third part is referred to as the third response, and wherein the instructions, when executed, are for further controlling the computing device to be configured for:
generating a third commitment, wherein the third commitment is a commitment to the predicate result, the first response, and the third response; and
transferring the third commitment to the second computing device;
receiving an open form of the garbled circuit;
determining the first challenge from the open form of the garbled circuit;
verifying from the open form of the garbled circuit that the garbled circuit is not configured to leak the private data; and
if the garbled circuit is not configured to leak the private data, transmitting the evaluation result to the second computing device, wherein if the third response is an actual commitment for the predicate result, then the first response and the third response are deemed true.

19. A computing device for proving that private data meets a criterion where the private data is not revealed, the computing device comprising:
a processor; and
a computer-readable storage medium comprises instructions for controlling the processor to be configured for:
transferring a first commitment and a second commitment to a second computing device, wherein the first commitment represents a commitment to the private data and a first random number and the second commitment represents a commitment to a second random number and a third random number;
receiving a first challenge that is a challenge to the first and the second commitments from the second computing device;
receiving a garbled circuit that includes predicate function and a first support function in encrypted forms from the second computing device, wherein the predicate function represents the criterion;
producing an evaluation result by evaluating the predicate function and the first support function of the garbled circuit using a first encryption result that represents the private data in encrypted form, a second encryption result that represents the second random number in encrypted form, and the first challenge, wherein the evaluation result includes a first part based on the first encryption result, the second encryption result, and the first challenge and includes a second part based on the first encryption result, the first part is referred to as the first response, and the second part is referred to as the predicate result;
transferring the evaluation result to the second computing device;
receiving a second challenge from the second computing device;
producing a second response from a second support function using the second challenge, the first random number, and the third random number; and
transferring the second response to the second computing device, wherein:
the first support function is a homomorphic mapping of a check function of the first and the second commitments, and
the predicate evaluation result over the private data is deemed true if a check function result of the check function is equal to a third commitment of the first response and the second response.

20. The computing device of claim 19, wherein the computer-readable storage medium comprises further instructions for controlling the processor to be configured for:
receiving the first encryption result from an encryption of the private data based on an oblivious transfer protocol; and
receiving the second encryption result from an encryption of the second random number based on the oblivious transfer protocol.

* * * * *